US008036805B2

(12) United States Patent  (10) Patent No.: US 8,036,805 B2
Mahoney et al.  (45) Date of Patent: Oct. 11, 2011

(54) DISTRIBUTED ENGINE CONTROL SYSTEM

(75) Inventors: Timothy D. Mahoney, Chandler, AZ (US); Scot E. Griffiths, Glendale, AZ (US); Larry J. Yount, Scottsdale, AZ (US); Richard F. Hess, Glendale, AZ (US); Brendan Hall, Eden Prairie, MN (US); Devesh Bhatt, Maple Grove, MN (US); William M. McMahon, Tucson, AZ (US); John Teager, Tucson, AZ (US); Philip E. Rose, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 1178 days.

(21) Appl. No.: 11/945,037

(22) Filed: Nov. 26, 2007

(65) Prior Publication Data

US 2009/0312892 A1 Dec. 17, 2009

Related U.S. Application Data

(60) Provisional application No. 60/949,734, filed on Jul. 13, 2007.

(51) Int. Cl.
*G06F 7/00* (2006.01)
(52) U.S. Cl. .............. 701/100; 701/99; 701/3
(58) Field of Classification Search .......... 701/99–100; 60/39.01, 239; 700/286–287, 290
See application file for complete search history.

(56) References Cited

U.S. PATENT DOCUMENTS

| | | | | |
|---|---|---|---|---|
| 3,811,273 | A | * | 5/1974 | Martin ............... 60/39.15 |
| 4,032,757 | A | * | 6/1977 | Eccles ............... 700/81 |
| 4,296,601 | A | * | 10/1981 | Martin ............... 60/224 |
| 4,497,059 | A | | 1/1985 | Smith |
| 4,785,403 | A | | 11/1988 | Kuhlberg |
| 5,183,387 | A | | 2/1993 | Huggett et al. |
| 5,184,456 | A | * | 2/1993 | Rumford et al. ...... 60/778 |
| 5,206,810 | A | | 4/1993 | Bools et al. |
| 5,436,826 | A | | 7/1995 | O'Flarity |
| 5,757,641 | A | | 5/1998 | Minto |
| 5,908,485 | A | | 6/1999 | Germanetti |
| 6,178,522 | B1 | | 1/2001 | Zhou et al. |
| 6,353,790 | B1 | | 3/2002 | Tsuzuki |
| 6,480,780 | B1 | | 11/2002 | Schwamm |
| 6,813,527 | B2 | | 11/2004 | Hess |
| 6,850,807 | B2 | | 2/2005 | Tahira |
| 6,922,625 | B2 | | 7/2005 | Weir et al. |
| 2003/0056494 | A1 | | 3/2003 | Coleman |
| 2005/0049775 | A1 | | 3/2005 | Mooney |
| 2006/0042846 | A1 | | 3/2006 | Kojori et al. |

* cited by examiner

*Primary Examiner* — Yonel Beaulieu
(74) *Attorney, Agent, or Firm* — Ingrassia Fisher & Lorenz, P.C.

(57) ABSTRACT

A distributed engine control system is provided. The engine control system includes first and second engine data concentrators. Each of the first and second engine data concentrators include a processor module, a signal conditioning module coupled to the processor module, a data transfer module coupled to the processor module, and a data bus coupled between the first and second engine data concentrators and a hydro-mechanical unit (HMU).

14 Claims, 3 Drawing Sheets

DISTRIBUTED ENGINE CONTROL SYSTEM

CROSS-REFERENCES TO RELATED APPLICATIONS

This application claims the benefit of U.S. Provisional Application No. 60/949,734, entitled "Distributed Engine Control System" filed on Jul. 13, 2007.

TECHNICAL FIELD

The present invention generally relates to gas turbine engine controls and, more particularly, to a distributed control architecture for gas turbine engine control systems.

BACKGROUND

Many modern gas turbine engines are controlled by a highly integrated dual channel engine-mounted engine controller, such as a Full Authority Digital Electronic Controls (FADEC). The FADEC implements a highly centralized and specialized design. The FADEC generally hosts all the needed interfaces with the aircraft and nacelle systems, and is configured to perform virtually all the engine control functions.

In contrast to the centralized approach of the FADEC, engine control architectures have been designed in which the functionality is more distributed around the engine to smart sensors and smart actuators. The intent of these alternative architectures is to reduce overall system weight by, for example, using fewer cables, to reduce the functionality within the FADEC for reduced weight and increased reliability, and to improve life cycle costs due to improved fault diagnostics.

Although safe, reliable, and robust, these alternative architectures do exhibit certain drawbacks. For example, these approaches can be limited in practicality because of the higher procurement costs of potentially specialized electronics or packaging that may be needed to survive the high temperature environments associated with an engine, and/or because of the overall increase in functional overhead to support a distributed controls network due, for example, to the use of many distributed smart nodes.

Hence, there is a need for a distributed engine control architecture that does not suffer the drawbacks of current FADECs and presently known alternative architectures.

BRIEF SUMMARY

In one embodiment, and by way of example only, a distributed engine control system is provided. The engine control system includes first and second engine data concentrators. Each of the first and second engine data concentrators include a processor module, a signal conditioning module coupled to the processor module, a data transfer module coupled to the processor module, and a data bus coupled between the first and second engine data concentrators and a hydro-mechanical unit (HMU).

In another embodiment, again by way of example only, a distributed engine control architecture is provided. The control architecture includes first and second engine data concentrating means. Each of the first and second data concentrating means includes signal conditioning means for conditioning inputted simplex and redundant data, data transfer means coupled to the signal conditioning means for routing the simplex and redundant data, processing means coupled to the data transfer means for processing the simplex and redundant data, and data bus means coupled between the first and second engine data concentrating means and a fuel control means to transfer data between the first and second engine data concentrating means and the fuel control means.

In still another embodiment, again by way of example only, a method of controlling an engine having first and second engine data concentrators is provided. The method includes signal conditioning inputted simplex and redundant data, multiplexing the inputted simplex and redundant data, converting analog simplex and redundant data into digital simplex and redundant data, processing the digital redundant data, and transferring the digital redundant and simplex data from the first engine data concentrator to the second engine data concentrator over a digital data bus.

DETAILED DESCRIPTION

Figure 1A:
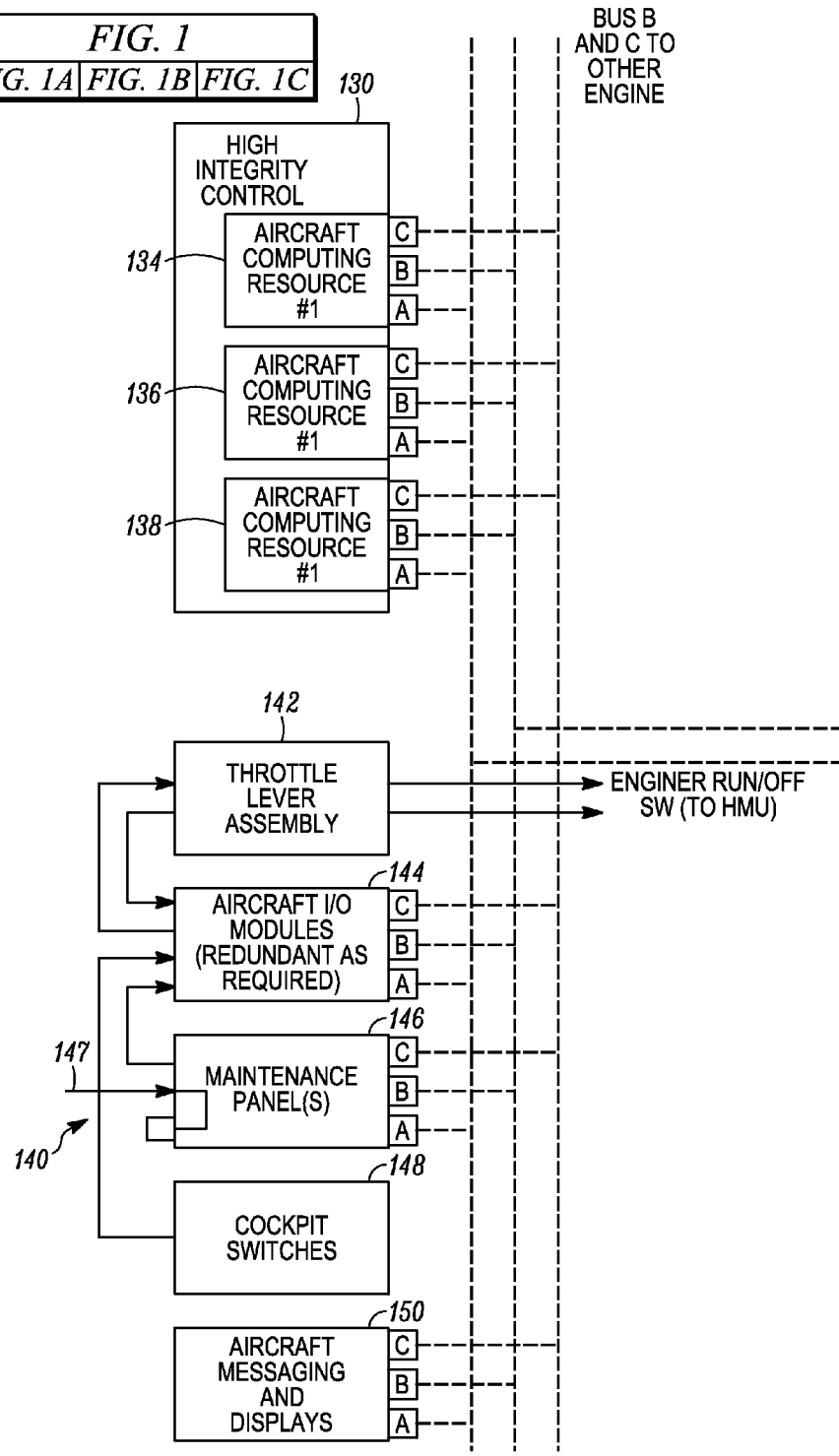
FIG. 1 (incorporating FIGS. 1A, 1B, and 1C) is a functional block diagram of an embodiment of distributed engine control architecture for a gas turbine engine.

The following detailed description is merely exemplary in nature and is not intended to limit the invention or the application and uses of the invention. Furthermore, there is no intention to be bound by any theory presented in the preceding background or the following detailed description.

Distributed engine control architecture may be implemented for engines such as a gas turbine engine in such settings as an aerospace setting. The architecture serves to alleviate many of the drawbacks previously described. To implement such architecture in an aerospace setting, for example, a significant portion of the traditional FADEC functionality may be moved off of the engine to available high-integrity aircraft resources. Much, and in some embodiments all, aircraft input/output (I/O) may be processed on the aircraft and transmitted via a high-integrity data bus to the engine. The more common engine I/O, in turn, may be processed in a generic engine data concentrator (EDC) as will be described.

High-integrity aircraft resources leveraged by such architecture can include systems such as existing flight control platforms and/or integrated modular avionics systems. These high-integrity systems preferably have a minimum of three redundant control modules to provide triple-redundant computations and data for embodiments of a distributed engine control system as will be further described in this specification and in the claimed subject matter.

Redundant I/O may be apportioned between two EDCs associated with each engine for availability. High availability may be retained for groups of simplex or non-essential data by including redundancy for those elements of the design that have unacceptably high postulated common mode failure rates. A redundant power condition module may be implemented to allow a generic, low cost power interface to each EDC.

A "smart" hydro-mechanical unit (HMU) may be coupled to the dual EDCs using the high-integrity data bus. Such an HMU may be configured with dual control nodes for local I/O processing, local loop closures, and independent overspeed detection and accommodation. The smart HMU may utilize either high-temperature electronics or fuel cooling to survive the environment. The EDCs and smart HMU receives three triple redundant copies of command and control data from the high integrity aircraft system previously described via the high-integrity data bus. This data may be arbitrated within two control nodes of the HMU as well as in one or more EDCs to control the HMU's outputs.

Using the exemplary distributed architecture as will be further described, many of the traditional functions of the FADEC may be distributed to the relatively low-cost, generic engine data concentrators (EDCs), to existing aircraft computational resources, and to the smart fuel control (e.g., smart HMU). This can result in reduced wire weight, scalable generic EDCs for reduced development costs, and more distributed functionality for improved maintenance diagnostics and availability. It should be recognized that FADEC functionality allocated to an EDC or HMU is relatively simple and thus implementations would be deterministic and analyzable.

The exemplary distributed architecture applies novel control network redundancy management methods to turbine engine control systems to achieve required integrity/availability for the distributed functions. These management methods will be further described, but include: (1) use of existing aircraft I/O resources such as a data bus and the high-integrity controls (HICs); (2) control of both engines using the HIC; (3) arbitration and validation of engine I/O in the HIC; (4) use of replica determinism for modular redundancy voting of commands at the EDCs or the HMU; (5) dualizing simplex inputs to mitigate the loss of multiple I/O; (6) facilitation of independent overspeed protection within the HMU; and (7) enablement of the HIC platform to perform functions previously too overbearing for a FADEC, such as model based prognostics. The architecture may be designed to accommodate varying levels of design robustness with respect to data integrity and availability.

Figure 1B:
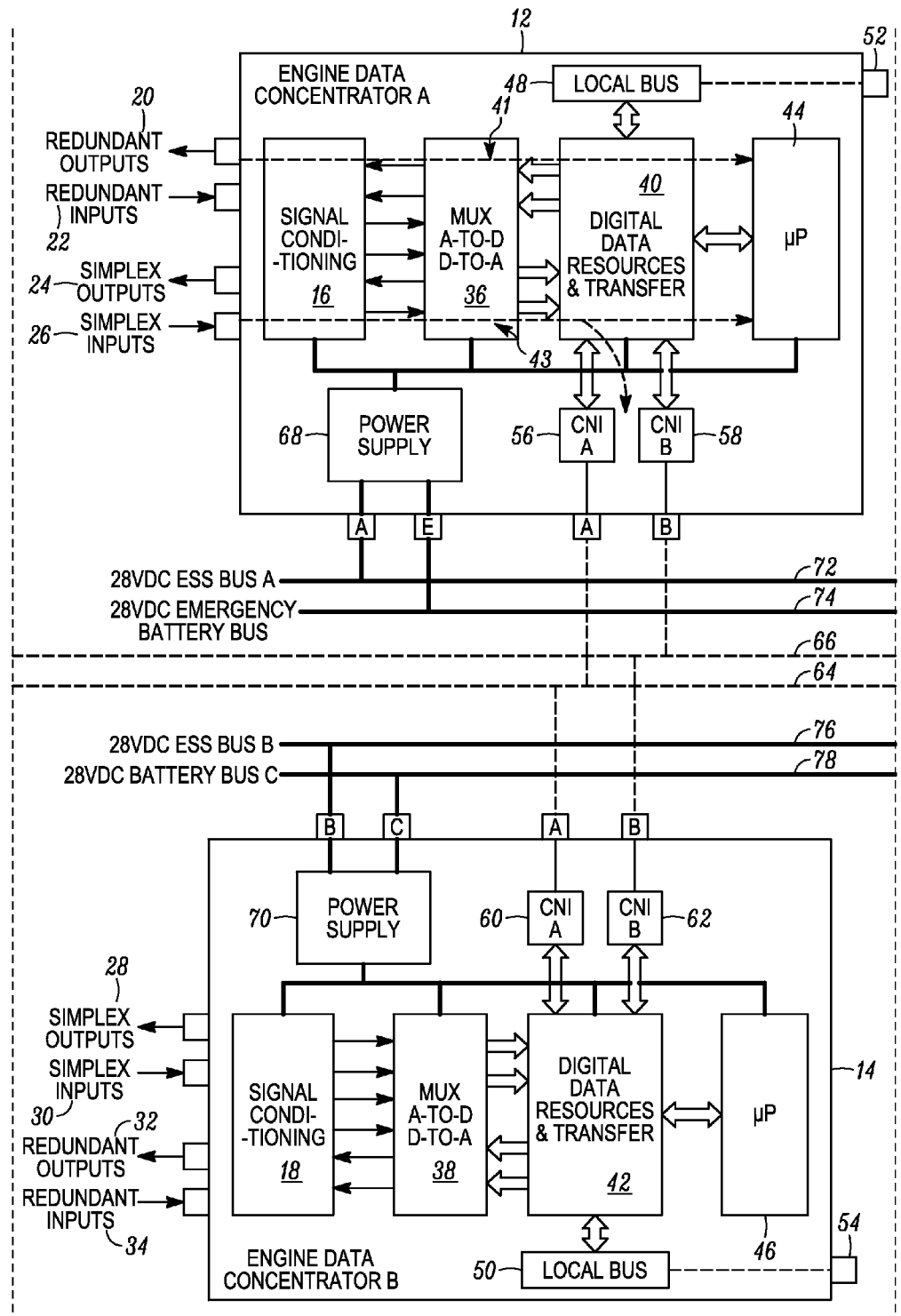
Figure 1C:
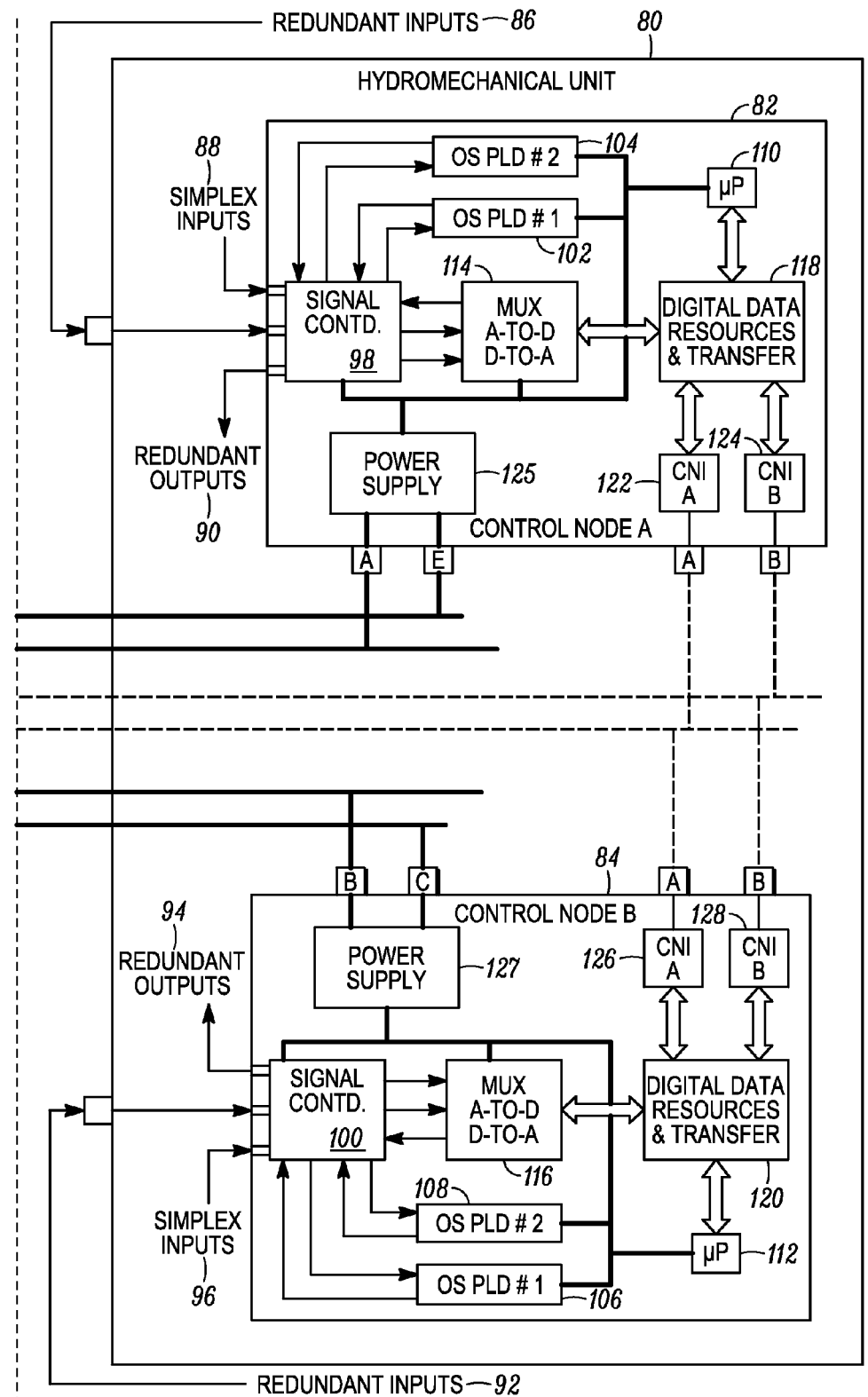

Turning to FIG. 1 (again incorporating FIGS. 1A, 1B, and 1C), exemplary distributed engine control architecture in accordance with the foregoing description is illustrated. Architecture is shown for a single engine of a multiple engine system. The exemplary architecture includes engine data concentrators (EDCs) 12 and 14. EDCs 12 and 14 are coupled to each other, to a hydro-mechanical unit (HMU) 80, to a high-integrity control platform 130, and to other existing resources of an aircraft using digital data busses 64 and 66. As one skilled in the art will appreciate, while two redundant EDCs 12 and 14 and depicted, any number of redundant EDCs may be implemented in a particular application, and may be coupled together using a varying amount and configuration of digital data busses to share information.

Use of data buses 64 and 66 allows various components of what would normally constitute a FADEC system to be moved off of the engine and distributed across an aircraft as shown. For example, much of such former FADEC functionality may be performed using existing high-integrity aircraft resources. Use of data busses 64 and 66 replace the use of various wiring and wiring harnesses, increasing quality and reliability of the engine and the aircraft while decreasing weight. Data busses 64 and 66 may be compliant with and/or utilize a variety of communications protocols, such as time-triggered protocol or an Ethernet protocol, for instance.

Each EDC 12 and 14 include various subcomponents that are used, for example, to input or output data, condition data, convert analog data to digital data and vice-versa, route data, and process data received from the existing high-integrity resources. Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Returning to EDCs 12 and 14, signal conditioning modules 16 and 18 perform signal conditioning functions on inputted and outputted signals. For example, various subcomponents of the signal conditioning modules 16 and 18 may filter an incoming analog signal to reduce undesirable noise. Such inputs and outputs to the signal conditioning modules 16 and 18 will be further described. In one embodiment, various sensors provide data to inputs of the signal conditioning modules 16 and 18. Various actuators such as a solenoid device receive data from the outputs of the signal conditioning modules 16 and 18.

Architecture 10 differentiates between various simplex data and various redundant and essential data for use in the engine control system. Redundant data is generally essential to various components of the architecture 10 in part by virtue of the data being generated by redundant sources. Simplex data, on the other hand, generally is generated or is obtained by a single source and is nonessential to a particular component.

Each EDC 12 and 14 includes a set of simplex data inputs and outputs and a set of redundant data inputs and outputs. Redundant data outputs 20, redundant data inputs 22, simplex data outputs 24, and simplex data inputs 26 are integrated into EDC 12 and coupled to the signal conditioning module 16. Similarly, simplex data outputs 28, simplex data inputs 30, redundant data outputs 32, and redundant data inputs 34 are integrated into EDC 14 and coupled to the signal conditioning module 18.

Various data inputs are redundant and essential to both EDC 12 and 14. For example, an oil pressure sensor may provide redundant data to both EDC 12 and EDC 14. Various data outputs are also redundant and essential to both EDC 12 and 14. For example, EDC 12 and 14 may provide redundant ignition relay outputs to an engine ignition relay.

Other various data inputs are simplex and non-essential, such as oil temperature. Similarly, various data outputs are simplex and non-essential, such as an anti-ice solenoid output. Simplex, non-essential inputs and outputs are apportioned between both EDC 12 and 14. For example, the oil temperature simplex data may be apportioned to EDC 12, while the anti-ice solenoid output data may be apportioned to EDC 14 and shared across the digital data busses 64 and 66.

By apportioning simplex, non-essential data between EDCs, the distributed engine control architecture saves resources, including weight and cost.

EDCs 12 and 14 include multiplexer modules 36 and 38 which are coupled to the signal conditioning modules 16 and 18. Multiplexer modules 36 and 38 may contain analog-to-digital (A/D) and digital-to-analog (A/D) converter devices to respectively convert the redundant and simplex data signals from/to analog/digital signals and vice-versa. Multiplexer modules 36 and 38 may combine several data signals into a single channel for data transfer and processing.

Data transfer modules 40 and 42 are coupled to multiplexer modules 36 and 38 for routing data onto and off of the data busses 64 and 66. In addition, transfer modules 40 and 44 selectively determine which data (redundant and/or simplex) will be provided to the locally residing processor modules (e.g., processor modules 44 and 46). In the depicted embodiment, redundant data (denoted by dotted line 41) is conditioned through signal conditioning module 16, converted from an analog signal to a digital data signal in multiplexer module 36, and routed through transfer module 40 to the processor module 44 for processing. For example, processor module 44 may receive simplex data relating to engine oil temperature or engine vibration, and thereby determine whether a control signal should be transmitted to an output (such as an engine actuator) in response. In some cases, local data busses such as local busses 48 and 50 may be coupled to transfer modules 40 and 40 to move data between local I/Os 52 and 54.

Simplex data which is apportioned between EDCs 12 and 14 (denoted by dotted line 43) is also conditioned through signal conditioning module 16, converted from an analog signal to a digital data signal in multiplexer module 36, and routed through transfer module 40 to the processor module 44 for processing. In addition, the simplex data is also routed through transfer module 40 to interfaces 56 and 58 of EDC 12 (associated with data lanes A and B) and onto the digital data buses 64 and 66. Such data is received through interfaces 60 and 62 (again associated with lanes A and B, respectively), and routed through transfer module 42 of EDC 14 to processor module 46.

For example, simplex data oil temperature may be apportioned to both EDCs 12 and 14. The oil temperature data may be inputted into simplex input 30 on EDC 14. The oil temperature data may then be conditioned by signal conditioning module 18, multiplexed and converted into a digital data signal by multiplexer module 38, and routed to processor module 46 for processing by the transfer module 42. In addition, the oil temperature data may be routed by the transfer module 42 onto either or both of the digital data busses 64 and 66 through interfaces 60 and 62. The digital oil temperature data then enters EDC 12 through interfaces 56 and 58 and into transfer module 40. From transfer module 40, the oil temperature data is shared with processor 44 for processing.

In some embodiments, simplex data may be shared across the digital data bus 66 (denoted as Bus B) and provided to the other engine. As will be further described, data from the high-integrity control platform 130 may also be shared across multiple engines using data busses such as data busses 64 and 66. By sharing non-essential data, components such as wiring, wiring harnesses and other hardware such as sensors or actuators may be eliminated to save weight and lower overall cost.

Independent redundant power supply modules 68 and 70 are integrated into or otherwise associated with EDCs 12 and 14 as shown, providing a source of power for each subcomponent in the EDC (e.g., signal conditioning module 16, multiplexer module 36, transfer module 40, and processor module 44). The power supplies 68 and 70 are coupled to a clean source of power. In the depicted embodiment, a clean, 28 volt DC bus 72 provides primary power to EDC 12, while an additional 28 volt DC bus 76 provides primary power to EDC 14. A battery bus 74 provides backup power to EDC 12, while a battery bus 78 provides backup power to EDC 14.

Power busses 72, 74, 76, and 78 share electrical connectivity with the hydro-mechanical unit 80 (HMU 80). HMU 80 again provides fuel control functionality for the engine. HMU 80 shares similar components as seen in EDCs 12 and 14 to provide redundancy and robustness. HMU includes two control node modules 82 and 84. Each control node 82 and 84 includes a set of redundant inputs 86 and 92 respectively for inputting redundant, essential data to each control node. Additionally, each control node 82 and 84 includes a set of simplex inputs 88 and 96 respectively for inputting simplex, non-essential data. Finally, each control node 82 and 84 includes a set of redundant outputs for control of redundant functionality essential to each control node 82 and 84.

Each control node 82 and 84 contains a signal conditioning module 98 and 100, a multiplexer 114 and 116, a data transfer module 118 and 120, a processor module 110 and 112, a power supply 125 and 127, and interfaces 122, 124 and 126, 128 which function in a similar manner to the functionality provided through EDCs 12 and 14. In addition, each control node module 82 and 84 includes a set of programmable logic devices (PLDs) 102, 104 and 106, 108 for arbitrating data as will be further described below.

In a similar manner to EDCs 12 and 14, simplex, non-essential data from simplex inputs 88 and 96 may be apportioned to both control node modules 82 and 84. For example, a fuel pressure switch simplex input may be assigned to simplex input 96 of control node 84 where it is received by signal conditioning module 100 and filtered. The fuel pressure data may then be multiplexed and converted to a digital fuel pressure signal through multiplexer module 116, where it is then passed to transfer module 120 to be shared with both processor 112 and, using interfaces 126, 128, 122, and 124 through digital data busses 64 and 66, processor 110.

Control node modules 82 and 84 may provide local arbitration of control signals received from the high-integrity control platform 130 (HIC 130) over data busses 64 and 66. For example, each control node module 82 and 84 may receive digital control data from the HIC 130. The digital control data may be accompanied by an arbitration or control algorithm stored on the HIC 130, and diagnostic information, such as signal health status information that the control node modules 82 and 84 may use to determine whether to use that particular control data, or control data from another redundant resource. The processor modules 110 and 112 may then function to arbitrate the data according to the arbitration algorithm, compare the data with feedback data from the controlled component, and issue a current command. Each processor module 110 and 112 may issue such current commands that, in one embodiment, may be read by integrating servo valves providing a result to an actuator component. Such functionality may be applicable to engine components such as inlet guide vein (IGV) components (e.g., IGV actuators), for example.

Control node modules 82 and 84 may be configured to detect data bus failures or interrupts on busses 64 and 66. In the event of a detected data bus interrupt or failure, the control node modules 82 and 84 can act to freeze all control loop set points received from the high-integrity control platform 130 until data is restored over the busses 64 and 66.

PLD devices 102, 104, 106, and 108 may function to provide closed loop control functionality. For example, PLD devices 102, 104, 106 and 108 can be utilized as a portion of a closed loop engine overspeed protection system. In one embodiment, PLD devices 102, 104, 106 and 108 may act as comparators between input signals, the output of the PLD devices provided to the driver functionality of one or more overspeed coils. In a two-coil embodiment, either coil may be driven to shut off fuel in the event of a detected engine overspeed condition.

High-integrity control platform 130 (HIC 130), as previously described, may contain a variety of redundant existing system components, such as flight control systems or integrated modular avionics systems of an aircraft. As shown, HIC 130 includes a first aircraft computing resource or module 134, a redundant second aircraft computing resource or module 136, and a redundant third aircraft computing resource or module 138. Various examples of this existing functionality may include input/output validation and arbitration, input synthesis functionality, active driver controls, power up logic, fuel scheduling, IGV scheduling, ignition scheduling, engine start logic, thrust settings, acceleration/deceleration controls, monitoring systems such as power plant monitors, lube system monitors, vibration monitors and engine condition monitors, fault reporting functionality, performance trending, time-limited dispatch functionality, life usage monitoring functionality, event recording functionality, and incident recording functionality. Each of this various functionality may be leveraged by the EDCs 12 and 14 and the HMU 80 so that the functionality need not additionally reside on the engine.

As seen, each of the redundant computing resources are connected to the digital data busses 64, 66, and 132 between each EDC 12 and 14, the HMU 80, and other similar components on other engines. Additional existing software, firmware and hardware functionality may be leveraged by the EDCs 12 and 14, and the HMU 80. This functionality 140 is shown in the depicted aerospace embodiment as throttle lever assembly functionality 142, various aircraft I/O modules 144 as required, maintenance panels 146 having redundant or simplex data inputs 147, cockpit switching functionality 148, and finally, aircraft messaging and display functionality 150. Functionality 140 is coupled to the digital data busses 64, 66, and 132 to share data with EDCs 12 and 14, and the HMU 80.

Now that the functionality of HMU 80, as well as the connectivity to HIC 130 and functionality 140 has been more adequately described, it may be further explained that all processed data (for example, redundant data processed by processor modules 44, 46, 110, and 112) may be digitally transferred through digital data busses 64, 66, and 132 to the high-integrity control platform for further availability. I/O validation and arbitration may be performed within each redundant HIC module (such as modules 134, 136, and 138). Each HIC module 134, 136, and 138 may generate output control commands and determine which of the redundant output drives, such as the redundant output drives 152 (denoted as A, B, and C) of module 134, should be active at a particular time. This results in a "triple modular redundancy" (TMR) of outputted data. These TMR commands and driver control data from the HIC 130 and/or functionality 140 is placed over the digital data busses 64, 66, and 132, where it is consumed and arbitrated by each redundant EDC 12, and 14, and the HMU 80.

The HIC 130 may receive all input data and all I/O data from each EDC 12 and 14. The HIC modules (e.g., modules 134, 136, and 138) may operate asynchronously. However, voting algorithms generated by each module should be identical and thereby tend to yield similar operational decisions and results. In one embodiment, functionality such as power-up testing is conducted in the HIC 130 with test instructions passed to the EDCs 12 and 14, and the HMU 80 for local power-up testing. The HIC 130 may perform outer loop control laws for all output control devices of the engine. Again, TMR outputs of the HIC 130 are placed over the data busses 64, 66, and 132. For example, IGV position commands may be sent to the HMU 80 (performing such IGV functionality as previously described) for fast local loop closures. The HIC 130 may perform all monitoring, data recording, fault detection and isolation, and accommodation functions. Much of this functionality is apportioned to the HIC 130 from the original FADEC functionality. In this manner, the HIC 130 may control both engines using the same resources.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention.

What is claimed is:

1. A distributed engine control system for a gas turbine engine incorporating a hydro-mechanical unit (HMU), comprising:
    first and second engine data concentrators, each of the first and second engine data concentrators including:
        a processor module,
        a signal conditioning module coupled to the processor module,
        a data transfer module coupled to the processor module; and
    a data bus coupled between the first and second engine data concentrators and the HMU.

2. The system of claim 1, further including first and second power and backup battery busses coupled to each of the first and second engine data concentrators to supply power.

3. The system of claim 1, wherein the signal conditioning module of each of the first and second engine data concentrators includes a redundant data input, a redundant data output, a simplex data input, and a simplex data output, each coupled to.

4. The system of claim 3, wherein each signal conditioning module is adapted to condition redundant data received through the redundant data input and simplex data received through the simplex data input.

5. The system of claim 4, wherein the data transfer module of the first engine data concentrator is adapted to:
    route the redundant data to the processor module of the first engine data concentrator,
    route the simplex data to the processor module of the first engine data concentrator, and
    route the simplex data over the data bus to the data transfer module of the second engine data concentrator.

6. The system of claim 5, wherein the data transfer module of the second engine data concentrator is adapted to route the simplex data received by the signal conditioning module of the first engine data concentrator to the processor module of the second engine data concentrator.

7. The system of claim 1, further including first and second control modules integrated into the HMU, each configured to receive the redundant and simplex data from each of the first and second engine data concentrators over the data bus.

8. The system of claim 1, wherein the data bus is compliant with a time-triggered protocol or an Ethernet protocol.

9. The system of claim 1, wherein the data bus is further coupled to a high-integrity control (HIC) platform to provide existing data resources to each of the engine data concentrators.

10. The system of claim 9, wherein the high-integrity control platform includes a flight control system or an integrated modular avionics platform having a plurality of redundant computing resources.

11. The system of claim 1, wherein each of the first and second engine data concentrators further include a multiplexer module coupled between the signal conditioning module and the data transfer module, the multiplexer module comprising:

analog-to-digital (A/D) and digital-to-analog (D/A) converters for converting analog redundant and simplex data to digital redundant and simplex data to be processed through the data transfer module.

12. A method of controlling an engine having first and second engine data concentrators, comprising:

signal conditioning inputted simplex and redundant data;

multiplexing the inputted simplex and redundant data, converting analog simplex and redundant data into digital simplex and redundant data;

processing the digital redundant data; and transferring the digital redundant and simplex data from the first engine data concentrator to the second engine data concentrator over a digital data bus.

13. The method of claim 12, further including transferring the digital redundant and simplex data from the first engine data concentrator to a hydro-mechanical unit for fuel control.

14. The method of claim 12, further including receiving a control algorithm over the digital data bus from a high-integrity control platform.

* * * * *

UNITED STATES PATENT AND TRADEMARK OFFICE
CERTIFICATE OF CORRECTION

PATENT NO. : 8,036,805 B2
APPLICATION NO. : 11/945037
DATED : October 11, 2011
INVENTOR(S) : Mahoney et al.

Page 1 of 1

It is certified that error appears in the above-identified patent and that said Letters Patent is hereby corrected as shown below:

On the Cover Page of the Patent, under (75) Inventors:

(US); Scot E. "Griffiths", Glendale, AZ should be changed to (US); Scot E. --Griffith--, Glendale, AZ.

Signed and Sealed this
Twentieth Day of March, 2012

David J. Kappos
*Director of the United States Patent and Trademark Office*